United States Patent
Diffin et al.

(10) Patent No.: US 11,292,514 B2
(45) Date of Patent: Apr. 5, 2022

(54) TORSION BAR FOR A STEERING SYSTEM ASSEMBLY

(71) Applicant: Steering Solutions IP Holding Corporation, Saginaw, MI (US)

(72) Inventors: Daniel J. Diffin, Freeland, MI (US); David E. King, Freeland, MI (US); Mark A. Wolfer, East Lansing, MI (US); Christopher L. Walsh, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/927,065

(22) Filed: Jul. 13, 2020

(65) Prior Publication Data

US 2020/0339190 A1    Oct. 29, 2020

Related U.S. Application Data

(62) Division of application No. 15/339,147, filed on Oct. 31, 2016, now abandoned.

(51) Int. Cl.
*B62D 1/20* (2006.01)
*B62D 6/00* (2006.01)
(Continued)

(52) U.S. Cl.
CPC ............... *B62D 6/008* (2013.01); *B21B 1/22* (2013.01); *B62D 1/20* (2013.01); *B62D 6/10* (2013.01);
(Continued)

(58) Field of Classification Search
CPC .. B62D 6/008; B62D 1/20; B62D 6/10; B62D 5/005; B21B 1/22; B60Y 2304/07;
(Continued)

(56) References Cited

U.S. PATENT DOCUMENTS 1,982,736 A * 12/1934 Judge ..................... B23P 15/48
                                                            409/67
3,003,782 A * 10/1961 Hickman ............... B60G 11/64
                                                            280/124.106
(Continued)

FOREIGN PATENT DOCUMENTS

CN        103057580 A       4/2013
CN        103124667 A       5/2013
(Continued)

OTHER PUBLICATIONS

English translation of First Office Action regarding related CN App. No. 2017110429958; dated Aug. 27, 2019.
(Continued)

*Primary Examiner* — Zakaria Elahmadi
(74) *Attorney, Agent, or Firm* — Dickinson Wright PLLC

(57) ABSTRACT

A method of manufacturing a torsion bar for a steering system is provided. The method includes supporting a torsion bar blank on a cold forming machine with a plurality of dies at a first end region of the torsion bar blank and a second end region of the torsion bar blank. The method also includes rolling the torsion bar blank to form an end region having a cylindrical outer surface extending from an axial end surface and a serrated portion disposed proximate the end region and axially offset from the axial end surface.

3 Claims, 6 Drawing Sheets

(51) Int. Cl.
  *F16D 1/08* (2006.01)
  *B21B 1/22* (2006.01)
  *B62D 6/10* (2006.01)
  *B62D 5/00* (2006.01)

(52) U.S. Cl.
  CPC ........ *F16D 1/0858* (2013.01); *B60Y 2304/07* (2013.01); *B60Y 2400/83* (2013.01); *B60Y 2410/1022* (2013.01); *B60Y 2410/12* (2013.01); *B62D 5/005* (2013.01)

(58) Field of Classification Search
  CPC ........ B60Y 2400/83; B60Y 2410/1022; B60Y 2410/12
  See application file for complete search history.

(56) References Cited

U.S. PATENT DOCUMENTS

| | | | | |
|---|---|---|---|---|
| 3,119,245 | A * | 1/1964 | Schulte | B21B 35/14 464/156 |
| 3,412,595 | A * | 11/1968 | Kull | B21K 27/04 72/405.15 |
| 3,591,136 | A * | 7/1971 | Bishop | B21K 1/54 251/209 |
| 3,800,386 | A * | 4/1974 | Bishop | B21K 1/54 29/890.132 |
| 4,100,785 | A * | 7/1978 | Bishop | B21J 5/12 72/189 |
| 4,282,782 | A * | 8/1981 | Jungesjo | B21H 5/00 76/107.1 |
| 4,651,551 | A * | 3/1987 | Bishop | B21K 1/20 72/189 |
| 4,738,151 | A * | 4/1988 | Russell | B23P 19/025 403/15 |
| 4,850,458 | A * | 7/1989 | Allan | F16D 59/00 188/134 |
| 6,058,591 | A * | 5/2000 | Prater | F16D 13/62 192/70 |
| 8,740,712 | B2 | 6/2014 | Kim | |
| 9,783,225 | B2 * | 10/2017 | Suzuki | B62D 5/0454 |
| 10,000,227 | B2 | 6/2018 | Kurokawa | |
| 10,160,483 | B2 | 12/2018 | Dutsky et al. | |
| 2002/0011047 | A1 * | 1/2002 | Obeshaw | B21C 37/154 52/794.1 |
| 2002/0062546 | A1 * | 5/2002 | Obeshaw | B32B 3/28 29/423 |
| 2004/0074327 | A1 * | 4/2004 | Huber | B21D 22/16 74/431 |
| 2004/0245759 | A1 * | 12/2004 | Yamada | B62D 1/185 280/775 |
| 2004/0250588 | A1 * | 12/2004 | Lev | B21B 13/00 72/184 |
| 2005/0070365 | A1 * | 3/2005 | Riefe | F16C 3/035 464/162 |
| 2005/0178608 | A1 * | 8/2005 | Shiino | B62D 5/0406 180/444 |
| 2006/0041448 | A1 * | 2/2006 | Patterson | G06Q 10/101 705/301 |
| 2006/0156847 | A1 * | 7/2006 | Huber | B21D 22/16 74/431 |
| 2007/0017313 | A1 * | 1/2007 | Pattok | F16B 17/004 74/388 PS |
| 2008/0035413 | A1 * | 2/2008 | Segawa | B62D 6/10 180/444 |
| 2010/0122598 | A1 * | 5/2010 | Salutzki | E05F 3/102 74/431 |
| 2012/0104717 | A1 * | 5/2012 | Hashimoto | B21B 22/025 280/124.166 |
| 2012/0142439 | A1 * | 6/2012 | Shibahiraki | B62D 1/16 464/153 |
| 2013/0239727 | A1 * | 9/2013 | Hamada | F01L 1/022 74/431 |
| 2014/0147197 | A1 * | 5/2014 | Yoshida | B62D 1/20 403/359.1 |
| 2014/0331788 | A1 * | 11/2014 | Ishimoto | G01L 5/221 73/862.325 |
| 2016/0146281 | A1 * | 5/2016 | Pattok | F16D 1/10 267/273 |
| 2016/0297465 | A1 * | 10/2016 | Miyawaki | B62D 1/20 |
| 2016/0304111 | A1 * | 10/2016 | Kurokawa | B62D 5/0409 |
| 2017/0002919 | A1 * | 1/2017 | Neumann | F16H 57/027 |
| 2017/0057539 | A1 * | 3/2017 | Kim | F16H 57/039 |
| 2017/0138429 | A1 * | 5/2017 | Kuroi | B60G 7/001 |
| 2019/0001774 | A1 * | 1/2019 | Iguchi | B21D 22/06 |
| 2020/0171560 | A1 * | 6/2020 | Sato | B21D 22/02 |

FOREIGN PATENT DOCUMENTS

| | | |
|---|---|---|
| CN | 104210531 A | 12/2014 |
| CN | 104590365 A | 5/2015 |
| CN | 105829190 A | 8/2016 |
| DE | 102015005588 A1 | 2/2016 |

OTHER PUBLICATIONS

First Office Action Search Report regarding related CN App. No. 2017110429958; dated Aug. 27, 2019.

* cited by examiner

TORSION BAR FOR A STEERING SYSTEM ASSEMBLY

CROSS-REFERENCE TO RELATED APPLICATION

This application is a divisional application of U.S. patent application Ser. No. 15/339,147, filed Oct. 31, 2016, the disclosure of which is incorporated by reference herein in its entirety.

BACKGROUND OF THE INVENTION

The subject matter disclosed herein relates to vehicle steering systems and, more particularly, to a torsion bar for steering systems, as well as a method of forming a torsion bar.

Power steering systems in vehicles use actuators or a worm and worm gear to provide assist and sometimes include capabilities such as variable effort steering and torque overlay to provide a desired response in the systems. Many actuators use a torsion bar, in combination with other mechanical and electrical components, to assist in measuring torque and to provide tactile feedback to the driver at the hand wheel.

The systems described above include a mechanical torsion bar disposed in a center cavity of an input shaft. The torsion bar is connected to an output shaft and the input shaft. The torsion bar imparts a torque on the steering wheel that provides a tactile response to a driver. In addition, the torsion bar ensures that the valve opening for a hydraulic power steering system is controlled as a function of the driver torque. In an electric power steering system, the deflection of the torsion bar is usually sensed with an electrical device such as a torque sensor. To ensure proper function of the torque sensor and to prevent unequal stress on the torsion bar, it is desirable for the torsion bar to twist equally in the clockwise and counterclockwise direction. The twisting of the torsion bar is limited by mechanical stops on the input and output shaft called stop teeth. However, the torsion bar installation process may inherently lead to challenges with centering the torsion bar.

The manufacturing process for torsion bars is often a source of the challenges associated with centering the torsion bar. Torsion bars may be formed by a rolling process that creates asymmetric material at the end of the torsion bar which causes it to twist during pressing of the torsion bar in the steering shaft. The asymmetry is caused by material pushing out past the support of a die during formation. The geometry of this material cannot be controlled with current rolling process and tooling. Costly and time consuming efforts are utilized to remove the material from the outer diameter of the torsion bar, but this involves significant investment in machines, such as grinding machines.

SUMMARY OF THE INVENTION

In accordance with an exemplary embodiment of the invention, a torsion bar for a steering system includes a main body. Also included is an end region having a cylindrical outer surface extending from an axial end surface. Further included is a serrated portion disposed proximate the end region and axially offset from the axial end surface.

In accordance with another exemplary embodiment of the invention, a torsion bar for a steering system includes a main body. Also included is an end region having a plurality of serrations circumferentially spaced from each other, each of the serrations having a leading edge to be press fit into a steering shaft, the leading edges oriented symmetrically about a central axis of the main body to avoid twisting during press fitting into the steering shaft.

In accordance with yet another exemplary embodiment of the invention, a method of manufacturing a torsion bar for a steering system is provided. The method includes supporting a torsion bar blank on a cold forming machine with a plurality of dies at a first end region of the torsion bar blank and a second end region of the torsion bar blank. The method also includes rolling the torsion bar blank to form an end region having a cylindrical outer surface extending from an axial end surface and a serrated portion disposed proximate the end region and axially offset from the axial end surface.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a steering system is provided. Numerous contemplated types of vehicles may benefit from the embodiments disclosed herein, including an automobile, for example.

Power steering systems may incorporate a torsion bar in hydraulic and electric actuators. The torsion bar typically facilitates measurement of driver torque by sensing the deflection of the torsion bar and rotational movement of the input shaft relative to the output shaft. In addition, the torsion bar also provides the necessary torque coupling between the driver and the rest of the steering system, thus providing a desired tactile "feel" to the user. The torsion bar assists with a return to center movement of the steering system. Therefore, it is desirable to ensure centering of the torsion bar during assembly of the steering system. The embodiments described herein assist with that effort.

Figure 1:
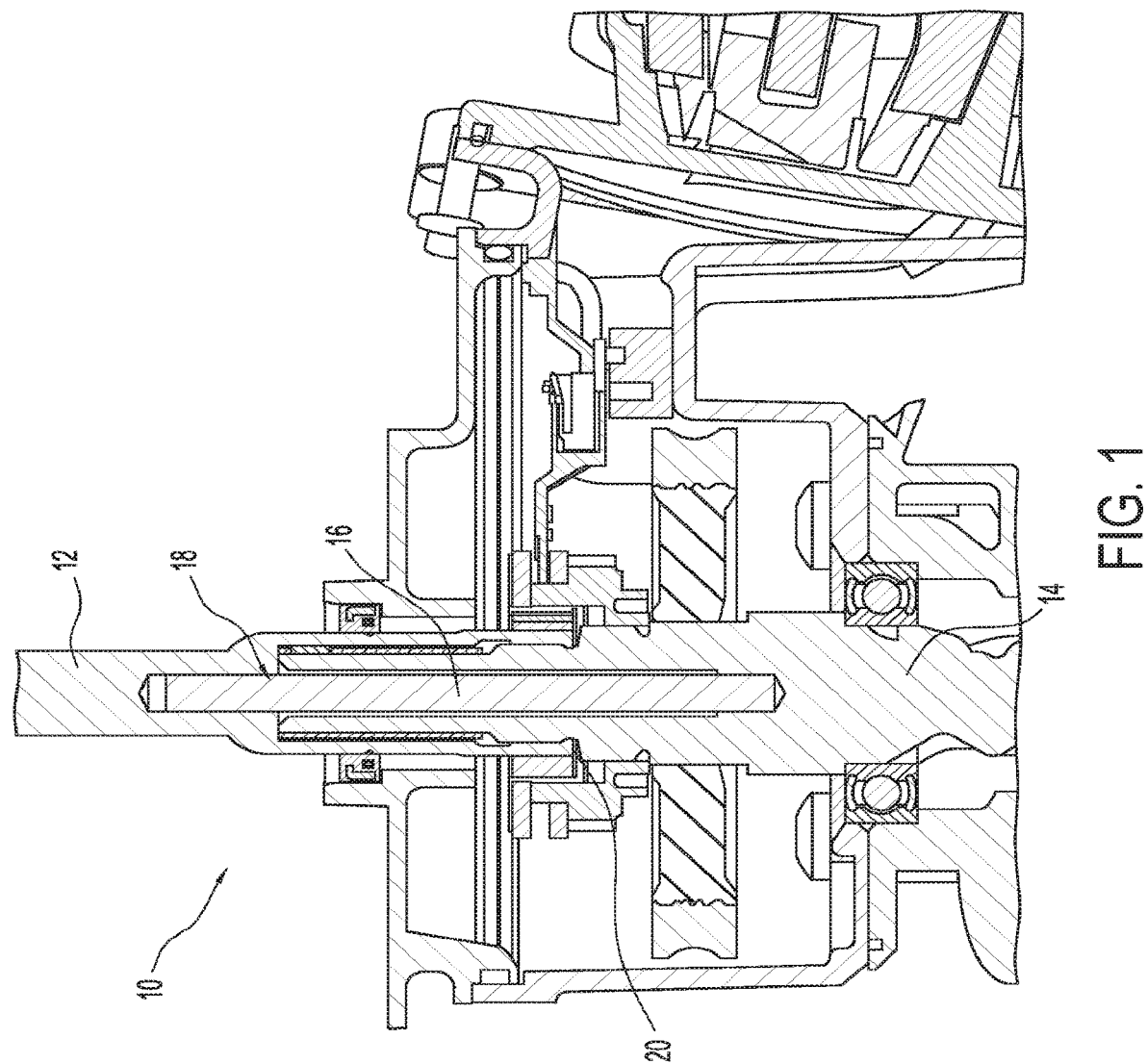
FIG. 1 is a sectional view of a steering system assembly.

Referring now to FIG. 1, a steering system 10 is illustrated. The steering system 10 includes an input shaft 12, also referred to herein as a first shaft. The input shaft 12 is operatively coupled to a steering wheel (not shown) at an end and rotates in response to rotation of the steering wheel by a user. The input shaft 12 is operatively coupled to an output shaft 14, also referred to herein as a second shaft, with a torsion bar 16, as will be further described below.

Upon final assembly, the torsion bar 16 imparts a torque on the steering wheel that provides a tactile response to the driver.

The torsion bar 16 is inserted into a cavity 18 of the input shaft 12. The cavity 18 is substantially centrally disposed about a longitudinal axis of the input shaft 12 and extends from an end 20 of the input shaft 12, such that the end 20 is open to receive the torsion bar 16. The torsion bar 16 is coupled to the input shaft 12 by press fitting the torsion bar 16 into the cavity 18. The torsion bar 16 extends out of the cavity 18 in a protruding manner subsequent to press fitting the torsion bar 16 into its coupled condition with the input shaft 12.

Figure 2:
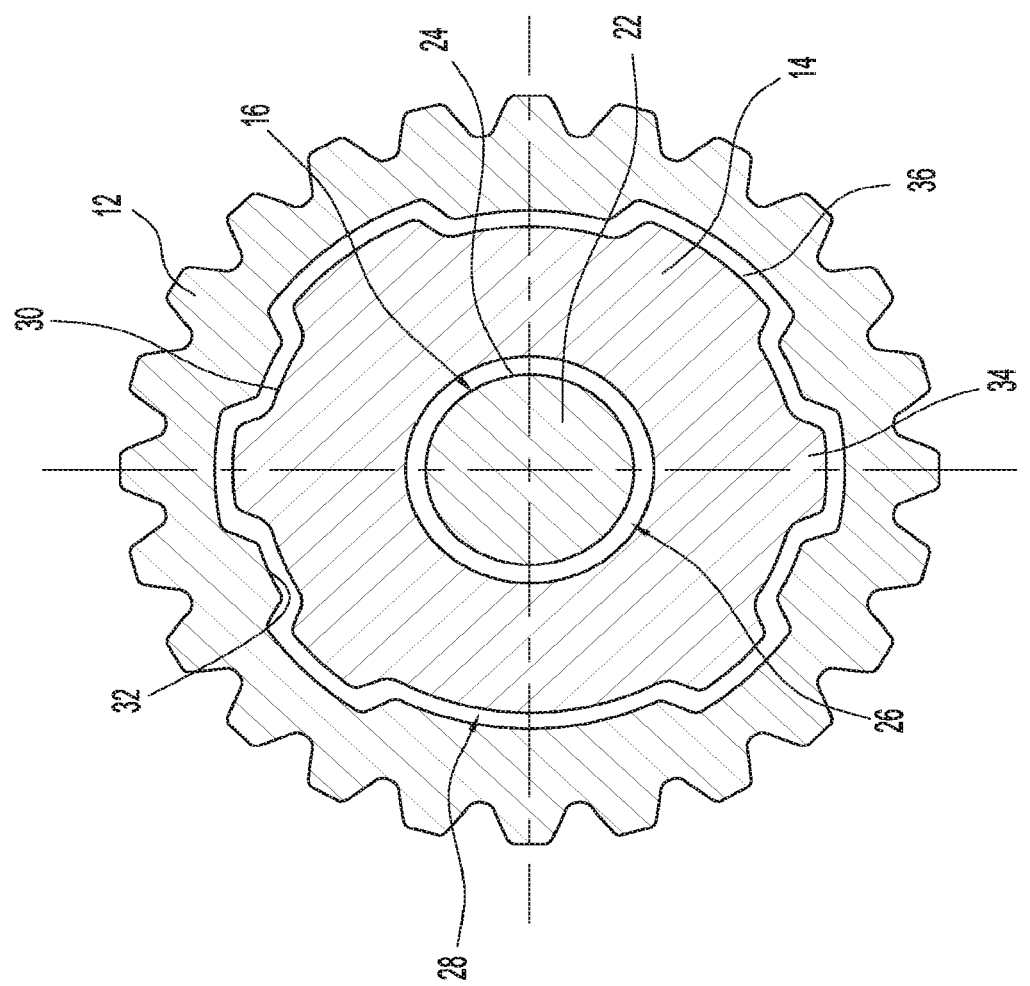
FIG. 2 is a sectional view of a torsion bar, a first steering shaft and a second steering shaft of the steering system.

FIG. 2 is a cross-sectional view illustrating a section of the input shaft 12, the output shaft 14 and the torsion bar 16 in an assembled condition. The section of the torsion bar 16 is a main body 22 of the torsion bar and is a substantially cylindrical section having a smooth, outer surface 24 defining a diameter of the main body 22. The section of the main body 22 is disposed within a cavity 26 of the output shaft 14 at a region where the output shaft 14 is disposed within a bore 28 of the input shaft 12. As shown, the outer surface 30 of the output shaft 14 and an inner surface 32 of the input shaft 12 have a substantially corresponding geometry comprising complementary protrusions 34 and recesses 36. Interaction of these components facilitates proper torque detection and steering assist feedback to a driver.

Figure 5:
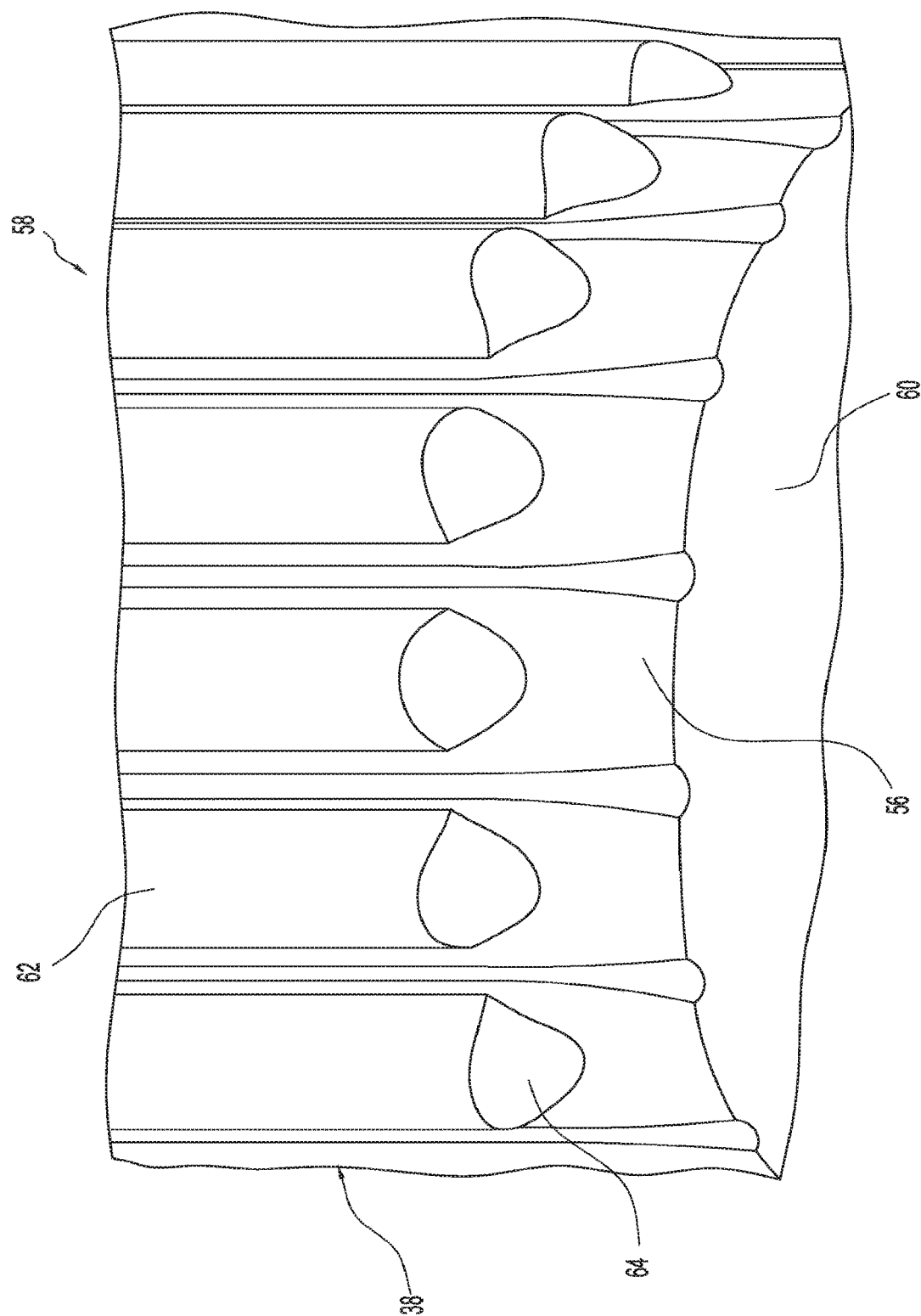
FIG. 5 is a perspective view of an end of the torsion bar.
Figure 6:
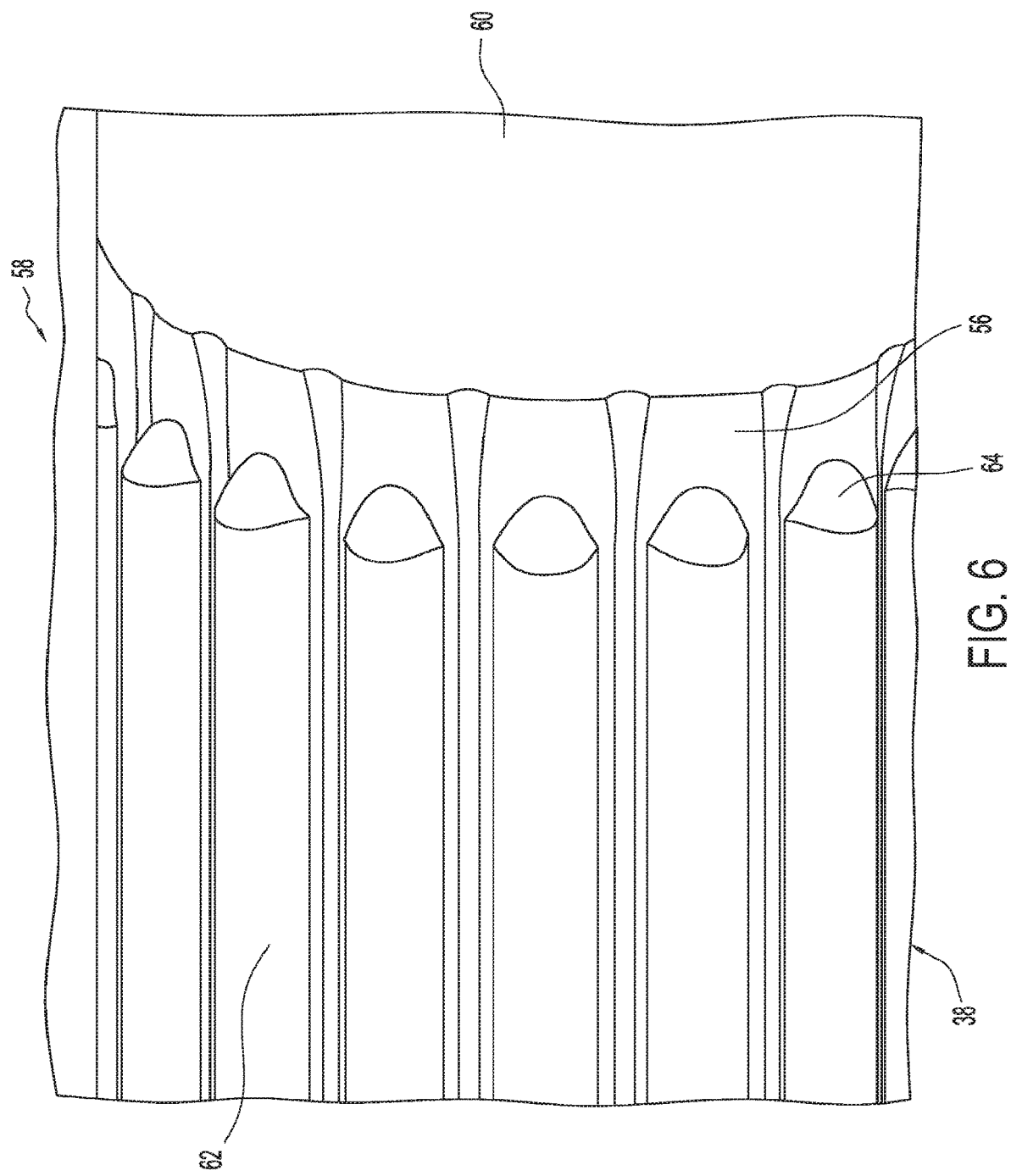
FIG. 6 is a perspective view of the end of the torsion bar illustrating another aspect of the invention.

The torsion bar 16 must be centered during the press fitting operation into the cavity 18 of the input shaft 12. Twisting during press fitting adversely affects a stop tooth balance between the above-described complementary protrusions 34 and recesses 36. Precise positioning of the torsion bar 16, and therefore the relative positioning of the input shaft 12 and the output shaft 14, is desirable. Asymmetry of leading edges of a serrated portion of the torsion bar 16 is often present due to prior manufacturing processes. As shown in FIGS. 5 and 6, the embodiments described herein provide symmetrical leading edges of a serrated portion 38 of the torsion bar 16.

Figure 3:
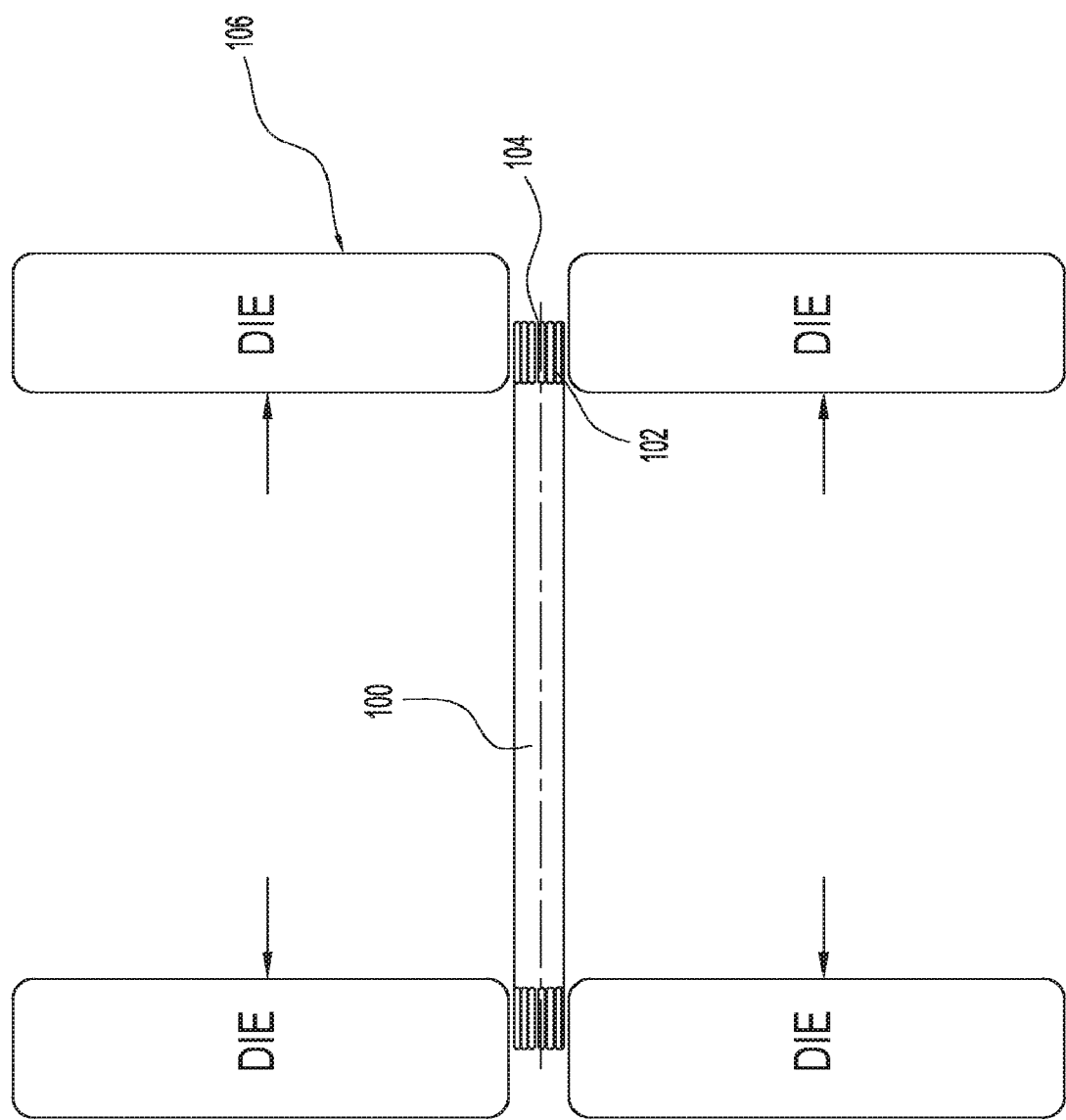
FIG. 3 is a schematic illustration of a process of forming a torsion bar of the steering system.

Referring now to FIG. 3, a torsion bar 100 having a serrated portion 102 that extends completely to an end 104 of the torsion bar 100 is shown. In other words, leading edges of the serrations of the serrated portion 102 are located at the end 104 of the torsion bar 100. Dies 106 supporting and forming the torsion bar 100 have the same tooth form across the entire width of each die. The dies 106 do not support the ends of the torsion bar 100 and a portion at the end of the bar does not completely fill the form of the dies 106. This creates an uncontrolled material flow and asymmetry at the leading edges (i.e., torsion bar tip). Such asymmetry undesirably leads to twisting during press fitting of the torsion bar into the steering shaft.

Figure 4:
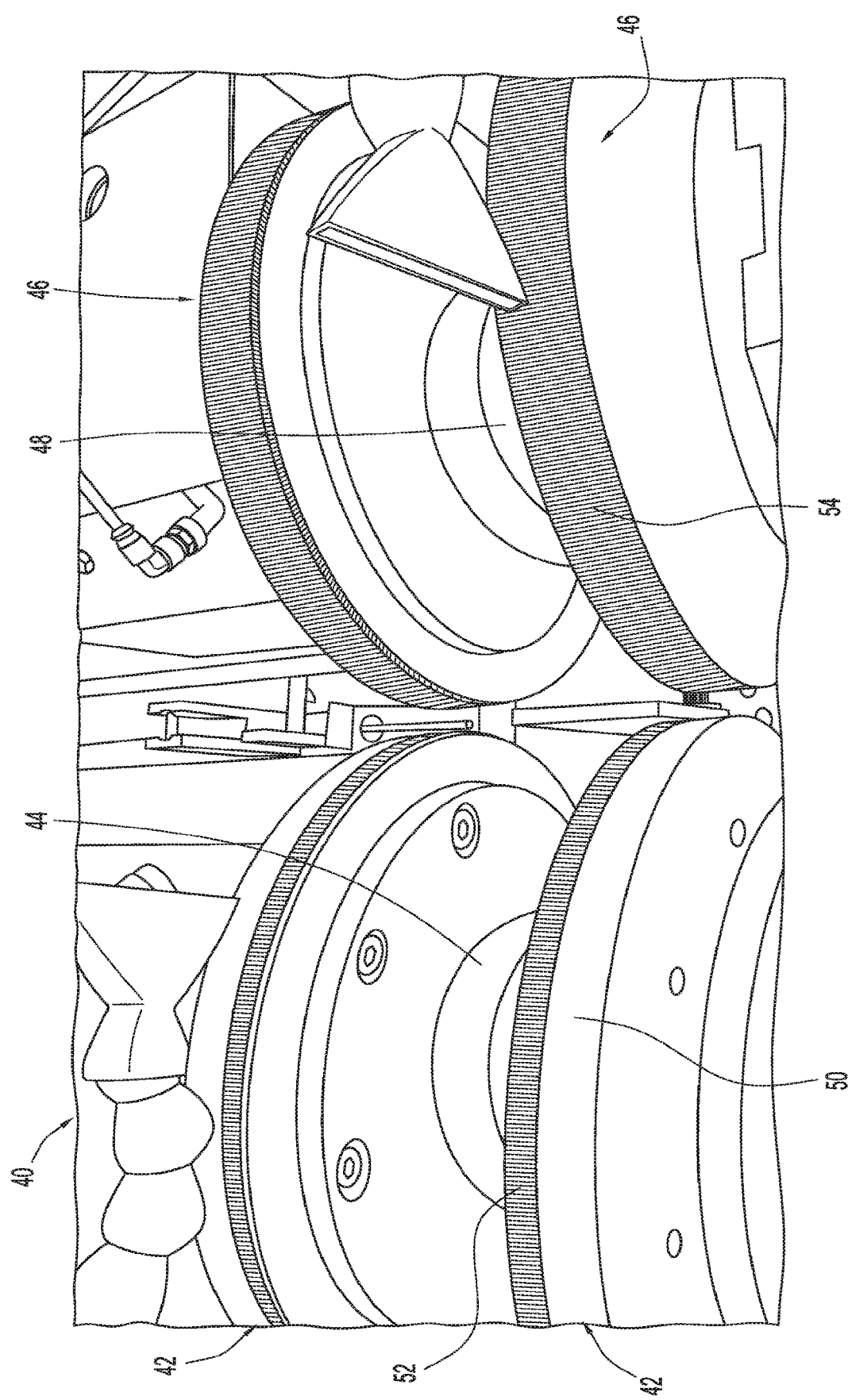
FIG. 4 is a perspective view of a rolling cold forming machine.

Referring to FIG. 4, a cold forming machine 40 with a plurality of dies is illustrated. In particular, a first pair of dies 42 rotated by a first spindle 44 and a second pair of dies 46 rotated by a second spindle 48 is shown. The dies 42, 46 support the torsion bar 16 at end regions thereof. The dies 42, 46 form the serrated portion 38 at the end regions of the torsion bar. A single end region will be described herein.

Each die of the first pair of dies 42 includes a smooth portion 50 and a toothed portion 52 of the width thereof. Each of the second pair of dies 46 only includes a toothed portion 54 of the width thereof. The smooth portion 50 of the dies of the first pair of dies 42 forms a substantially cylindrical outer surface 56 of an end region 58 of the torsion bar 16, while the toothed portion 52 forms the serrated portion 38 of the end region 58 of the torsion bar 16 (FIGS. 5 and 6).

Referring to FIGS. 5 and 6, the end region 58 of the torsion bar 16 that is formed by the dies 42, 46 is illustrated. The end region 58 includes the cylindrical outer surface 56 that extends axially from an end surface 60 of the torsion bar 16. This region is fully supported by the smooth portion 50 of the first pair of dies 42 and the serrated portion 38 of the torsion bar 16 is formed axially offset from the end surface 60. The serrated portion 38 includes a plurality of serrations 62 circumferentially spaced from each other. Each of the serrations 62 have a leading edge 64 that is the initial portion of the serration that is press fit into the cavity 18 of the inner shaft 12. By axially offsetting the leading edges 64 from the end surface 60, the leading edges are controlled to form a symmetrical arrangement of leading edges that will not lead to twisting during press fitting. The leading edges 64 have a common geometry that is substantially identical to facilitate press fitting. In some embodiments, the leading edges have a partially conical geometry in the axial and/or radial direction.

Advantageously, the leading edges of the rolled serrations (i.e., serrations 64) are controlled, leading to a symmetric arrangement that will not twist during press fitting. The controlled tip will allow the shaft assembly centering requirement to be met while eliminating the need for secondary processes, such as grinding, that are costly and time-consuming This reduces piece price and capital cost significantly.

Advantageously, the embodiments described above reduce or eliminate any off-centering effects inherently associated with coupling operations (e.g., press fitting) made between the torsion bar 16 and the input shaft 12 and/or output shaft 14, thereby ensuring proper function of the torque sensor during vehicle operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:
1. A method of manufacturing a torsion bar for a steering system comprising:
   supporting a torsion bar blank on a cold forming machine with a plurality of dies at a first end region of the torsion bar blank and a second end region of the torsion bar blank; and
   rolling the torsion bar blank to form an end region having a cylindrical outer surface extending from an axial end surface and a serrated portion disposed proximate the end region and axially offset from the axial end surface, wherein the plurality of dies comprises a first pair of dies driven by a first spindle and a second pair of dies driven by a second spindle, wherein each of the first pair of dies includes a toothed portion to form the serrated portion and a smooth portion to form the end region, wherein each of the second pair of dies only includes a toothed portion.

2. The method of claim 1, wherein forming the serrated portion comprises forming a plurality of leading edges oriented symmetrically about a central axis of the torsion bar to avoid twisting during press fitting of the torsion bar into a steering shaft.

3. The method of claim 1, wherein forming the serrated portion comprises forming a plurality of leading edges that are partially conical.

* * * * *